(12) United States Patent
Nauka et al.

(10) Patent No.: US 11,772,163 B2
(45) Date of Patent: Oct. 3, 2023

(54) THREE-DIMENSIONAL PRINTING SYSTEMS

(71) Applicant: HEWLETT-PACKARD DEVELOPMENT COMPANY, L.P., Spring, TX (US)

(72) Inventors: Krzysztof Nauka, Palo Alto, CA (US); Paul Olubummo, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,885

(22) PCT Filed: Feb. 9, 2018

(86) PCT No.: PCT/US2018/017528
§ 371 (c)(1),
(2) Date: Oct. 21, 2019

(87) PCT Pub. No.: WO2019/156674
PCT Pub. Date: Aug. 15, 2019

(65) Prior Publication Data
US 2021/0283687 A1    Sep. 16, 2021

(51) Int. Cl.
*B22F 10/14* (2021.01)
*B33Y 10/00* (2015.01)
(Continued)

(52) U.S. Cl.
CPC .............. *B22F 10/14* (2021.01); *B22F 10/34* (2021.01); *B22F 12/17* (2021.01); *B22F 12/43* (2021.01);
(Continued)

(58) Field of Classification Search
CPC .............................. B23K 15/086; B28B 1/001; B22F 2003/1057
See application file for complete search history.

(56) References Cited

U.S. PATENT DOCUMENTS

| 6,508,980 B1* | 1/2003 | Sachs ..................... B22F 10/10 419/45 |
| 6,585,930 B2 | 7/2003 | Liu et al. |

(Continued)

FOREIGN PATENT DOCUMENTS

| CN | 105451916 A | 3/2016 |
| EP | 1039980 B1 | 11/2004 |

(Continued)

OTHER PUBLICATIONS

Cacace, S. et al. "Densification mechanism for different types of stainless steel powders in selective laser melting". 2017. Procedia CIRP. 62. p. 475-480. (Year: 2017).*

(Continued)

*Primary Examiner* — Nicholas A Wang
(74) *Attorney, Agent, or Firm* — Shook, Hardy & Bacon L.L.P.

(57) ABSTRACT

The present disclosure is drawn to a three-dimensional printing system can include a powder bed material, including from 80 wt % to 100 wt % metal particles having a D50 particle size distribution value ranging from 5 μm to 75 μm and a powder bed support substrate for receiving the powder bed material. The system can also include a fluid ejector operable to digitally deposit a thermally sensitive binder fluid onto a selected portion of the powder bed material on the powder bed support substrate. The thermally sensitive binder fluid can include water, a reducible metal compound, and a thermally activated reducing agent. A light source can also be present to generate a pulse energy sufficient to cause the thermally activated reducing agent to reduce the reducible metal compound and bind metal particles together to form a green three-dimensional part.

17 Claims, 3 Drawing Sheets

(51) Int. Cl.
   *B33Y 30/00* (2015.01)
   *B22F 12/17* (2021.01)
   *B22F 12/43* (2021.01)
   *B33Y 70/10* (2020.01)
   *B22F 10/34* (2021.01)
   *B22F 1/052* (2022.01)

(52) U.S. Cl.
   CPC ........... *B33Y 10/00* (2014.12); *B33Y 30/00* (2014.12); *B33Y 70/10* (2020.01); *B22F 1/052* (2022.01); *B22F 2304/05* (2013.01); *B22F 2304/10* (2013.01)

(56) References Cited

U.S. PATENT DOCUMENTS

| | | | |
|---|---|---|---|
| 2014/0322501 A1 | 10/2014 | Ederer et al. | |
| 2014/0342497 A1 | 11/2014 | Goel et al. | |
| 2015/0165556 A1* | 6/2015 | Jones | B29C 64/153 264/482 |
| 2016/0243619 A1* | 8/2016 | Gothait | C09D 11/30 |
| 2017/0059676 A1 | 3/2017 | Yang et al. | |
| 2017/0182558 A1 | 6/2017 | Shimizu et al. | |

FOREIGN PATENT DOCUMENTS

| | | | |
|---|---|---|---|
| SU | 1227338 | * | 4/1986 |
| WO | WO-9915293 | | 4/1999 |
| WO | WO-2015056230 | | 4/2015 |
| WO | WO2016152023 A1 | | 9/2016 |
| WO | WO2016187538 A1 | | 11/2016 |
| WO | WO2017131760 A1 | | 8/2017 |
| WO | WO2017180161 A1 | | 10/2017 |
| WO | WO2017184127 A1 | | 10/2017 |
| WO | 2017/196321 A1 | | 11/2017 |
| WO | WO-2018017130 | | 1/2018 |
| WO | WO-2019088965 | | 5/2019 |

OTHER PUBLICATIONS

Wu, J. et al. "Solvothermal synthesis of uniform bismuth nanospheres using poly(n-vinyl-2-pyrrolidone) as a reducing agent." 2011. Nanoscale research letters. 6:66. p.1-8. (Year: 2011).*

Nandwana, Peeyush, et al. "Powder bed binder jet 3D printing of Inconel 718: Densification, microstructural evolution and challenges☆." Current Opinion in Solid State and Materials Science 21, No. 4 (2017): 207-218.

Yoo, "Reactive Binders for Metal Parts Produced By Three Dimensional Printing", Massachusetts Institute of Technology, May 1977, 107 pages.

* cited by examiner

THREE-DIMENSIONAL PRINTING SYSTEMS

BACKGROUND

Three-dimensional printing can include any of a number of technologies used to print three-dimensional parts. One example includes the application of a polymeric binder or other fluid(s) to a powder bed material on layer-by-layer basis to form a three-dimensional part. Other types of three-dimensional printing include printing polymers in the form of polymer melts, printing reactive materials together to form parts, among others.

DETAILED DESCRIPTION

Three-dimensional manufacturing can be carried out using metal particles of a powder bed material and selectively printing or ejecting a thermally sensitive binder fluid onto portions of the metal particles in a layer by layer manner. By adding an additional layer of metal particles and repeating application of the thermally sensitive binder fluid, a three-dimensional green part or object can be formed. The green part is not typically the finished part, but can retain a shape that is mechanically strong enough to be moved from the powder bed to an oven to be heat fused, sintered, and/or annealed. In accordance with the present disclosure, the thermally sensitive binder fluid can be prepared as a binder system that is not based on the more traditional polymeric binders. Rather, reducible metal compounds, e.g., inorganic metal oxides, inorganic metal salts, organic metal salts, etc., can be reduced in the presence of a thermally activated reducing agent. A "thermally activated reducing agent" can be defined as a chemical compound that releases hydrogen ion(s) when rapidly exposed to heat, e.g., flash heating, suitable to reduce the reducible metal compound. "Flash" heating refers to a method of rapidly heating by pulsing high levels of light energy, such as from a xenon pulse or strobe lamp or similar device. Near instantaneous or instantaneous temperatures can be generated using one or more pulse of light energy with a wide degree of temperature tenability, e.g., from 200° C. to 1000° C. Once reduced, metal content from the reducible metal compound can bind the metal particles together to form a layer of the green part or object, and ultimately after additively generating multiple layers in this manner, a three-dimensional green part or object can be formed. As mentioned, the flash heat can be applied incrementally, periodically, or in any suitable manner to initiate or further the thermally activated redox-reaction, such as to individual layers during the build process, or upon formation of a small number of layers, e.g., 2 to 4 layers. During flash heating, for example, volatile materials can be evaporated off and the remaining metal (e.g., from the reducible metal compound reduced at elevated temperature) can bind the larger metal particles together. Thus, both the "binder" that remains and the build material can be metal in nature, providing the ability to avoid the use of polymeric binders as desired.

In accordance with examples of the present disclosure, a three-dimensional printing system can include a powder bed material, including from 80 wt % to 100 wt % metal particles having a D50 particle size distribution value ranging from 5 μm to 75 μm and a powder bed support substrate for receiving the powder bed material. The system can also include a fluid ejector operable to digitally deposit a thermally sensitive binder fluid onto a selected portion of the powder bed material on the powder bed support substrate. The thermally sensitive binder fluid can include water (and in some instances other liquid vehicle components), a reducible metal compound, and a thermally activated reducing agent. A light source can also be present to generate a pulse energy sufficient to cause the thermally activated reducing agent to reduce the reducible metal compound and bind metal particles together to form a green three-dimensional part. In one example, the metal particles are selected from aluminum, titanium, copper, cobalt, chromium, nickel, vanadium, tungsten, tungsten carbide, tantalum, molybdenum, gold, silver, stainless steel, steel, alloys thereof, or admixtures thereof. In further detail, the thermally sensitive binder fluid is a polymeric binder-free thermally sensitive binder fluid. As a note, the term "polymeric binder-free" does not preclude the use of surfactant or other oligomer or small polymers that may be included in the thermally sensitive binder fluid as a dispersing agent for nanoparticles (or pigments) or for other purposes related to fluid ejection properties, but rather indicates that binding polymer is not included nor does any polymer remain in the three-dimensional part after flash heating that would be effective for binding metal particles together, for example. In another example, the reducible metal compound can include a metal oxide, or it can include a metal salt selected from metal bromides, metal chlorides, metal nitrates, metal sulfates, metal nitrites, metal carbonates, or a combination thereof. The reducible metal compound can include metal compound nanoparticles having a particle size from 10 nm to 1 μm, for example. In one more specific example, water can be present at from 20 wt % to 95 wt %, the inorganic metal compound is present at from 2 wt % to 40 wt %, and a thermally activated reducing agent is present at from 2 wt % to 40 wt %. The thermally activated reducing agent can be selected from hydrogen, lithium aluminum hydride, sodium borohydride, a borane, sodium hydrosulfite, hydrazine, a hindered amine, 2-pyrrolidone, ascorbic acid, a reducing sugar, diisobutylaluminium hydride, formic acid, formaldehyde, or mixtures thereof. In further detail regarding flash heating, the pulse energy can be from 15 J/cm$^2$ to 50 J/cm$^2$, and the light source is positioned within 5 mm to 150 mm away from the powder bed material during operation.

In another example, a three-dimensional printing system can include a powder bed material, including from 80 wt % to 100 wt % metal particles having a D50 particle size distribution value ranging from 5 μm to 75 μm and a powder bed support substrate for receiving the powder bed material. The system can also include a fluid ejector operable to digitally deposit a thermally sensitive binder fluid onto a selected portion of the powder bed material on the powder bed support substrate. The thermally sensitive binder fluid can include water (and in some instances other liquid vehicle components), a reducible metal compound, and a thermally activated reducing agent. A light source can also be present to generate a pulse energy sufficient to cause the thermally activated reducing agent to reduce the reducible metal compound and bind metal particles together to form a green three-dimensional part. The system can also include a heating chamber to convert the green three-dimensional part to a heat-fused three-dimensional part of sintered powder bed material.

In another example, a method of three-dimensional printing can include spreading a layer of powder bed material at a thickness of from 20 µm to 400 µm on a powder bed support substrate, ejecting a thermally sensitive binder fluid into a selected portion of the thickness of the powder bed material, and flash heating the thermally sensitive binder fluid in contact with the powder bed material at a pulse energy sufficient to cause the thermally activated reducing agent to reduce the inorganic metal compound and bind metal particles together. The powder bed material can include from 80 wt % to 100 wt % metal particles having a D50 particle size distribution value ranging from 5 µm to 75 µm. The thermally sensitive binder fluid can include water, an inorganic metal compound, and a thermally activated reducing agent. In one example, the method can include spreading a second layer of the powder bed material on top of the layer of powder bed material after flash heating, ejecting a second portion of the thermally sensitive binder fluid onto a second selected portion of the second layer, and flash heating the second portion of the thermally sensitive binder fluid in contact with the second layer of the powder bed material at a pulse energy sufficient to cause the thermally activated reducing agent to reduce the inorganic metal compound and bind metal particles together within the second layer of powder bed material as well as to metal particles of the layer of powder bed material. A green three-dimensional part can be formed that comprises the first layer and the second layer after flash heating the first layer and the second layer. In one example, the green three-dimensional part can undergo radiant heating to form a heat-fused three-dimensional part of sintered powder bed material. In another example, the method can include ejecting a third portion of the thermally sensitive binder fluid after flash heating the layer of powder bed material, but before spreading the second layer of the powder bed material. In this case, the additional (third portion) of the thermally sensitive binder fluid can be included to improve adhesion of the subsequently applied layer, e.g., the second layer of the powder bed material or any other subsequent layer, to the previously flash heated layers. In still further detail, the pulse energy applied can be from 15 J/cm$^2$ to 50 J/cm$^2$.

It is noted that when discussing the three-dimensional printing systems or methods of the present disclosure, each of these discussions can be considered applicable to other examples whether or not they are explicitly discussed in the context of that example. Thus, for example, in discussing a thermally activated reducing agent related to the three-dimensional printing systems, such disclosure is also relevant to and directly supported in context of the methods, and vice versa.

Turning now to example details related to the powder bed material and the thermally sensitive binder fluid, sometimes collectively referred to as a "material set," the powder bed material can include from 80 wt % to 100 wt % metal particles, from 90 wt % to 100 wt % metal particles, from 99 wt % to 100 wt % metal particles, or can essentially be composed of all metal particles. The metal particles can be elemental metals, such as elemental transition metals. Examples can include titanium, copper, cobalt, chromium, nickel, vanadium, tungsten, tantalum, molybdenum, gold, silver, etc. The metal particles can also be aluminum (which is not a transition metal), or it can be an alloy of multiple metals or can include a metalloid(s). In some examples, the alloy can be steel or stainless steel. Even though steel includes carbon, it is still considered to be metal in accordance with examples of the present disclosure because of its metal-like properties. Other metal alloys that may include some carbon or small amounts of non-metal dopant, metalloid, impurities, etc., can also be considered to be a "metal" in accordance with the present disclosure. Examples of elements that can be included in metal alloys or blends include H, C, N, O, F, P, S, Cl, Se, Br, I, At, noble gases (He, Ne, Ar, Kr, Xe, Rn), etc. Metalloids that can be included in some examples include B, Si, Ge, As, Sb, etc. More generally, a "metal" can be an elemental metal or alloy that exhibits properties generally associated with metals in metallurgy, e.g., malleability, ductility, fusibility, mechanical strength, high melting temperature, high density, high heat and electrical conduction, sinterable, etc.

The metal particles can exhibit good flowability within the powder bed material. The shape type of the metal particles can be spherical, irregular spherical, rounded, semi-rounded, discoidal, angular, subangular, cubic, cylindrical, or any combination thereof, to name a few. In one example, the metal particles can include spherical particles, irregular spherical particles, rounded particles, or other particle shapes that have an aspect ratio from 1.5:1 to 1:1, from 1.2:1, or about 1:1. In some examples, the shape of the metal particles can be uniform or substantially uniform, which can allow for relatively uniform melting or sintering of the particulates after the three-dimensional green part or object is formed and then heat fused in a sintering or annealing oven, for example. The particle size distribution can also vary. As used herein, particle size refers to the value of the diameter of spherical particles, or in particles that are not spherical, can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range). That being stated, an exemplary Gaussian distribution of the metal particles can be characterized generally using "D10," "D50," and "D90" particle size distribution values, where D10 refers to the particle size at the 10$^{th}$ percentile, D50 refers to the particle size at the 50$^{th}$ percentile, and D90 refers to the particle size at the 90$^{th}$ percentile size. For example, a D50 value of 25 µm means that 50% of the particles (by number) have a particle size greater than 25 µm and 50% of the particles have a particle size less than 25 µm. A D10 value of 10 µm means that 10% of the particles are smaller than 10 µm and 90% are larger than 10 µm. A D90 value of 50 µm means that 90% of the particles are smaller than 50 µm and 10% are larger than 50 µm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can still be considered to be essentially referred to as "Gaussian" as used conventionally.

In accordance with this, in one example, the metal particles can have a D50 particle size distribution value that can range from 5 µm to 75 µm, from 10 µm to 60 µm, or from 20 µm to 50 µm. In other examples, the metal particles can have a D10 particle size distribution value can range from 1 µm to 50 µm, or from 5 µm to 30 µm. In another example, of the D90 particle size distribution value can range from 10 µm to 100 µm, or from 25 µm to 80 µm.

The metal particles can be produced using any manufacturing method. However, in one example, the metal particles can be manufactured by a gas atomization process. During gas atomization, a molten metal is atomized by inert gas jets into fine metal droplets that cool while falling in an atomizing tower. Gas atomization can allow for the formation of mostly spherical particles. In another example, the metal particles can be manufactured by a liquid atomization process.

In further detail, the material set can also include a thermally sensitive binder fluid, and in one example, a polymeric binder-free thermally sensitive binder fluid. The thermally sensitive binder fluid can include, for example, an aqueous liquid vehicle, a reducible metal compound, and a thermally activated reducing agent. In one example, the thermally sensitive binder fluids can include from 20 wt % to 95 wt %, from 30 wt % to 80 wt % water, or from 50 wt % to 80 wt % water. The reducible metal compound can be present at from 2 wt % to 40 wt %, from 7 wt % to 30 wt %, or from 10 wt % to 35 wt %. The thermally activated reducing agent can be present at from 2 wt % to 40 wt %, from 7 wt % to 30 wt %, or from 10 wt % to 35 wt %. When selecting or formulating a thermally sensitive binder fluid to use with the powder bed material, and particularly the metal particles of the powder bed material, a reducible metal compound can be selected that will work well to bind the metal particles together, even when there may be little to no traditional polymeric binder material present. For example, the metal particles may be of a first metal material, and the reducible metal compound may include a common metal found in the metal particles. To illustrate, if stainless steel is used as the metal particles, the reducible metal compound may be an iron oxide or salt, or a chromium oxide or salt, for example. In other examples, metals of different types can be used. Considering the stainless steel example, the reducible metal compound may be, for example a copper oxide.

As mentioned, the reducible metal compound can be reduced by hydrogen released from the thermally activated reducing agent. Examples of reducible metal compounds can include metal oxides (from one or more oxidation state), such as a copper oxide, e.g., copper I oxide or copper II oxide; an iron oxide, e.g., iron(II) oxide or iron(III) oxide; an aluminum oxide, a chromium oxide, e.g., chromium(IV) oxide; titanium oxide, a silver oxide, zinc oxide, etc. As a note, due to variable oxidation states of transition metals, they can form various oxides in different oxidation states, e.g., transition metals can form oxides of different oxidation states.

Other examples can include organic or inorganic metal salts. In particular, inorganic metal salts that can be used include metal bromides, metal chlorides, metal nitrates, metal sulfates, metal nitrites, metal carbonates, or a combination thereof. Organic metal salts can include chromic acid, chrome sulfate, cobalt sulfate, potassium gold cyanide, potassium silver cyanide, copper cyanide, copper sulfate, nickel carbonate, nickel chloride, nickel fluoride, nickel nitrate, nickel sulfate, potassium hexahydroxy stannate, sodium hexahydroxy stannate, silver cyanide, silver ethansulfonate, silver nitrate, sodium zincate, stannous chloride (or tin(II) chloride), stannous sulfate (or tin(II) sulfate, zinc chloride, zinc cyanide, tin methansulfonate, for example. In some instances, the reducible metal compound can be in the form of a nanoparticle, and in other instances, the reducible metal compound can be disassociated or dissolved in the aqueous liquid vehicle, e.g., copper nitrate or copper chloride. As nanoparticles, the reducible metal compound can have a D50 particle size from 10 nm to 1 µm, from 15 nm to 750 nm, or from 20 nm to 400 nm. Thermally sensitive binder fluids can be digitally ejectable from a fluid ejector with reliability, such as a piezoelectric fluid ejector or even a thermal fluid ejector in some examples.

The thermally activated reducing agent can be particularly sensitive to rapidly applied elevated temperatures that may result from exposure to flash heating. Example thermally activated reducing agents can include hydrogen ($H_2$), lithium aluminum hydride, sodium borohydride, a borane (e.g., diborane, catecholborane, etc.) sodium hydrosulfite, hydrazine, a hindered amine, 2-pyrrolidone, ascorbic acid, a reducing sugar (e.g., a monosaccharide), diisobutylaluminium hydride, formic acid, formaldehyde, or mixtures thereof. The choice of reducing agent can be such that it is thermally activated as may be dictated by the choice of the thermally reducible metal compound, e.g. to keep the metal oxide or salt primarily in its native or original state (as an oxide or salt) until their reaction with the reducing agent is desired at the elevated temperatures described herein, e.g., at flash heating. If the reducing agent and the metal oxide or salt is too reactive, e.g., at room temperature, the reducible metal compound (oxide or salt) can become reduced prematurely in the binder fluid leaving behind reduced metal nanoparticles that could easily degrade by contact with air/moisture. The binder fluid of the present disclosure is thus intended to be a "thermally sensitive" binder fluid, meaning the metal oxide or salt is not reduced until printed in a powder bed material and then exposed to rapid heat increases by flash heating. Thus, the choice of the combination of reducing agent and reducible metal compound (e.g., nanoparticles) can be dictated by the desire to not initiate this reaction at an appreciable level until printed and exposed to flash heating. In further detail, the selection of the thermally activated reducing agent can thus depend on the reactivity and/or surface chemistry of the reducible metal compound. For example, the thermally activated reducing agent can be selected so that it is thermally sensitive relative to the reducible metal compound. If the reducible metal compound is highly reactive, a reducing agent can be selected that may not be reactive with the reducible metal compound at room temperature, but would be upon exposure to flash heating temperatures. To illustrate, if considering a metal oxide nanoparticle as the reducible metal compound, there may be metal oxides that are stable (or relatively unreactive) at room temperature, but upon application of heat, e.g., 200° C. to 1000° C. or 250° C. to 1000° C. or from 300° C. to 700° C., a redox-reaction can result in the production of the pure metal or metal alloy. That being stated, by adding a thermally sensitive reducing agent, the reduction can be more efficient and may occur at even lower temperatures (still above room temperature), e.g., from 200° C. to 700° C. For example, mercury oxide or silver oxide can be reduced to their respective elemental metal by heating rapidly to about 300° C., but the presence of a reducing agent will make the reaction occur at a lower temperature, e.g., about 180 to 200° C. Oxides of more reactive metals like zinc, iron, copper, nickel, tin, or lead are normally reduced simply in the presence of a reducing agent, so a reducing agent that may be less likely to liberate hydrogen prior to being heated can be used that is thermally sensitive relative to the reducible metal oxide selected for use. In any event, any of these thermally activated reducing agents listed herein (and many others) can be capable of providing hydrogen moieties completing the redox-reaction at elevated temperatures in accordance with examples of the present disclosure. In still further detail, a thermally activated reducing agent can be mixed with a reducible metal compound (such as an oxide) and heated to cause the redox-reaction shown in Formula 1, as follows:

(1)

In further detail regarding generating and exposing the powder bed material and the thermally sensitive binder fluid to high temperatures, such as an essentially instantaneous high reaction temperature, e.g., from 200° C. to 1000° C., from 250° C. to 1000° C., from 300° C. to 700° C., etc., as mentioned, these temperatures can be obtained by heating with a flash heating or light source. Raising the temperature rapidly can accelerate the redox-reaction and can enable reactions that may not occur readily at room temperature. Flash heating (using a flash pulse power source, for example) can generate these temperatures with efficiency, as a flash heating process can be tuned to facilitate heating to any temperature above room temperature up to even a melting temperature of many metals. That being mentioned, reducing the reducible metal compound in the presence of a thermally sensitive reducing agent can be carried out at a temperature well below the melting temperature of the metal, thus providing metal binder to join or adhere powder bed metal particles together in a sufficiently strong manner to allow for further processing, e.g., oven heating, sintering, annealing, etc.

In further detail, in order to generate three-dimensional printed parts, such as green parts or even finished heat fused parts, three-dimensional powder-bend printing can be carried out, for example. To illustrate, a layer of the powder bed material, which includes from mostly to all metal particles, can be deposited and spread out, typically evenly at the top surface, on powder bed support substrate. The layer of powder bed material can be from 25 μm to 400 μm, from 75 μm to 400 μm, from 100 μm to 400 μm, 150 μm to 350 μm, or from 200 μm to 350 μm, for example. The thickness of the layer can be determined in part based on the powder bed material particle size or particle size distribution, e.g., D50 particle size, etc., and/or upon the desired resolution of the printed part, and/or the amount of thermally sensitive binder fluid applied to an uppermost surface of the powder bed material layer at each build layer, etc. Next, the thermally sensitive binder fluid can then be selectively printed on a portion of the powder bed material in a desired pattern corresponding to a layer of the three-dimensional part to be printed. This can be carried out at a relatively low temperature (temperature typically below 200° C.). Notably, elevated temperature can provide some removal (evaporation) of volatile liquid components of the thermally sensitive binder fluid prior to flash heating, e.g., elevated above about 100° C. Next, the powder bed material layer printed with binder fluid can be exposed to a pulse of light or optical energy to essentially instantaneously raise the temperature (e.g., usually above about 200° C.) of the layer to initiate the thermally activated redox-reaction between the reducible metal compound and the thermally activated reducing agent (now held within the layer of powder bed material). Volatile byproducts not already removed during printing (e.g., typically below 200° C.) may be further removed at this even higher temperature. The redox-reaction between the thermally activated reducing agent and the reducible metal compound can produce an elemental metal or metal alloy (or admixture of metals). In further detail, Formula 2 below illustrates possible reactants, processing parameters, intermediates, and reaction products, as follows:

Reducible Metal or Metal Alloy Compound+Thermally Activated Reducing Agent+Flash Heating→

Reducible Metal or Metal Alloy Compound+Reactive Moieties from Flash Heating-decomposed Thermally Activated Reducing Agent→

Pure Metal or Alloy (binder for metal particles)+ Volatile Products from Reaction between Reducible Metal or Metal Alloy Compound and Reactive Moieties. (2)

After flash heating the layer to form a "green layer" of the "green" three-dimensional part, a new layer of powder bed material can be applied thereto and the printing and flash heating process repeated, etc. In some examples, after flash heating, prior to applying the next layer of powder bed material, a subsequent layer of thermally sensitive binder fluid can be applied thereto (either with or without flash heating) to provide additional inter-layer adhesion strength. Flash heating, or pulse thermal processing, allows for achieving relatively high mechanical strength of printed three-dimensional parts, which is sufficient to handle the part without damage, e.g., picking up part, inspecting part, moving part to an annealing or sintering oven, etc. For example, a single green layer prepared as described above using copper oxide nanoparticles as the reducible metal compound (and an excess of thermally activated reducing agent) digitally ejected into a 100 wt % stainless steel powder bed and flash heated left only 0.2 wt % elemental copper (as the binder) in a powder bed material of 99.8 wt % stainless steel metal particles. The green layer was strong enough to manually manipulate and move, even though the layer was only about 300 μm thick. Thus, though the reducible metal compound and the thermally activated reducing agent can each be present in the thermally sensitive binder fluid at from 2 wt % to 40 wt %, the metal that remains in the green printed part as metal binder (elemental, alloy, blends thereof, etc.) may be quite low, e.g., from 0.05 wt % to 2 wt %, from 0.1 wt % to 1 wt %, from 0.2 wt % to 0.8 wt %. In this specific example, the flash heating was used to instantaneously raise the temperature to above 400° C. The thermally sensitive fluid binder can be formulated and used to partially wet the surface of the metal particles. However, in some examples, most of the fluid can be drawn into the powder bed material by capillary forces to regions where the metal particles are vicinal to one other (contact between adjacent particles). Flash heating can be used to remove liquid components from the thermally sensitive binder fluid to decompose or reduce the metal compound. Thus, metal nanoparticles produced by this redox reaction can melt, flow, and may partially diffuse into the larger metal particles of the powder bed material.

The term "pulse" heating or "flash" heating (or fusion) refers to raising a temperature of a surface layer of a powder bed material with thermally sensitive binder fluid printed thereon in a duration of few (or less) milliseconds. Flash heating can be tuned, for example, to have little to no impact on already applied underlying part layer of the printed object, except in some instances perhaps to assist in adhering a newly formed layer to the subsequently applied and flash heated layer. Flash heating can, in other examples, have some impact on lower layers, depending on the material and the layer thickness. By using these very short heating durations, thermal stresses can be reduced in some examples, which can ameliorate potential breaking of newly formed bonds between adjacent metal particles of the powder bed material, while at the same time, reducing energy and printing costs.

Example pulse energies that can be irradiated by a flash or pulse light source can be from 15 J/cm$^2$ to 50 J/cm$^2$ (positioned from 5 mm to 150 mm away from the powder bed material), or from 20 J/cm$^2$ to 45 J/cm$^2$, or from 20 J/cm$^2$ to 40 J/cm$^2$, for example. The light source can be a non-coherent light source such as a pulsed gas discharge lamp. In further detail, the light source can be a commercially available xenon pulse lamp. In other examples, the light source can be positioned at from 25 mm to 125 mm, 75 mm to 150 mm, 30 mm to 70 mm, or 10 mm to 20 mm away from the powder bed material during operation. It should also be noted that pulsing the light energy (or flash heating) can be based on a single pulse or repeated pulses as may be designed for a specific application to advance or even complete the redox reaction. To illustrate, a higher energy single pulse may be enough to cause a fast redox reaction to occur, or multiple lower energy pulses can likewise be used if a slower redox reaction may be desired (per layer), e.g., from 2 to 1000 pulses, from 2 to 100 pulses, from 2 to 20 pulses, from 5 to 1000 pulses, from 5 to 100 pulses, etc.

Once the three-dimensional green part or object is formed, the green part can be transferred or otherwise heated in a more traditional oven, such as an annealing oven or a sintering oven, to cause the larger metal particles of the powder bed material (bound together with the metal binder after the flash heating) to melt together, become sintered together, or otherwise form a more permanent structure compared to the green part.

Figure 1:
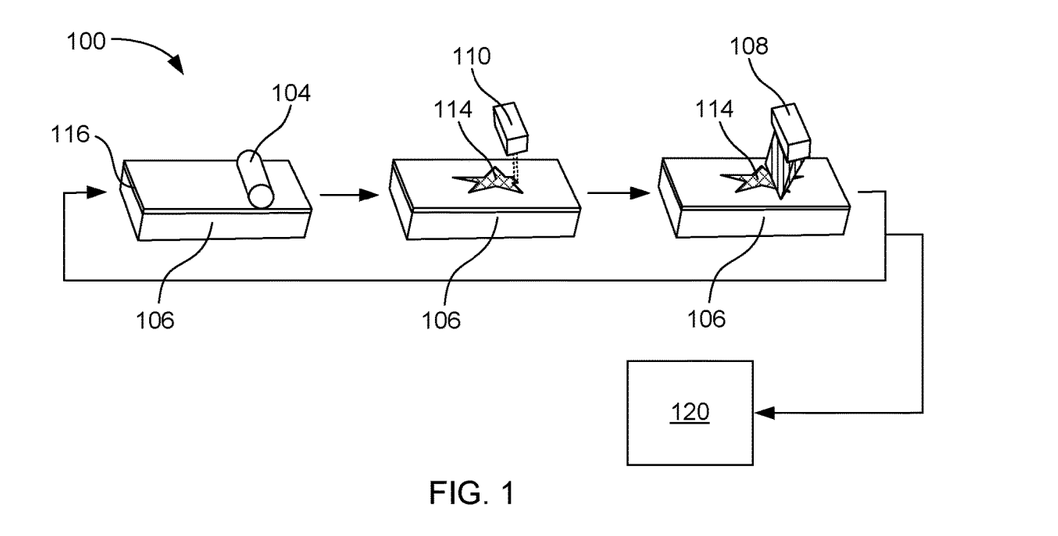
FIG. 1 schematically depicts an example system for three-dimensional printing in accordance with the present disclosure.

To provide some examples by way of illustration, FIG. 1 depicts a three-dimensional printing system 100 where a powder bed material 106, which include metal particles, can be used to prepared three-dimensional green parts or objects. To begin (or continue) printing the part, a new top layer 116 of powder bed material is applied to an existing substrate (either the support substrate that supports the powder bed material, or previously deposited powder bed material), and in this example, is flattened using a roller 104. A thermally sensitive binder fluid, which is contained and printed from a fluid ejector 110, such as a digital inkjet pen, is applied to the top layer of the powder bed material in a selected pattern 114. The top layer of powder bed material with the thermally sensitive binder fluid printed thereon (or within some or all of the top layer) can then be flash heated from a flash heating light source 108, such as a xenon lamp, at an irradiation energy level(s) (pulsed rapidly, slowly, at different energies, at different frequencies or timings, etc.) suitable for the components present in the material set as a whole to form a solidified or rigid layer. The process is then repeated to generate a three-dimensional green part or object that can be later heat fused in an oven 120, such as a high temperature sintering or annealing oven to heat fuse the green part or object using radiant heat, for example, or by some other heating technique.

In further detail regarding the heat fusing that can occur after the green part or object is formed, this process can be analogous to that used for sintering or fusing of injection molded (MIM) parts or objects. In one example, a furnace can be used that is big enough to accommodate multiple printed parts (batch annealing). In another example, the ambient environment can be inert. As an annealing example, heating can include a slow, gradual temperature raise with one or more stage where the temperature may be held constant for some time. The heating profile over time can be adjusted as per the specific materials selected for use. In one example, a typical temperature raise gradient can be on the order of about 5° C. to 20° C. per hour, or about 10° C. per hour. Maximum heating temperatures can be at or about the typical melting temperature of the metal particles or less (but enough to fuse or sinter adjacent particles together), e.g., 1460° C. for stainless steel minus $\Delta$T where delta T is from 0 to 500° C. Regardless of the metal particle powder bed material selected for use, in one example, a goal of heat fusing can be to eliminate or substantially eliminate voids between the particles and achieve desired metal part density (usually between 90% to 100% of bulk metal to increase the hardness of the three-dimensional part or object to something very rigid, solid, sturdy, etc.). When voids are eliminated, the part can shrink and the surface roughness can be decreased (but does not typically go to zero).

Figure 2:
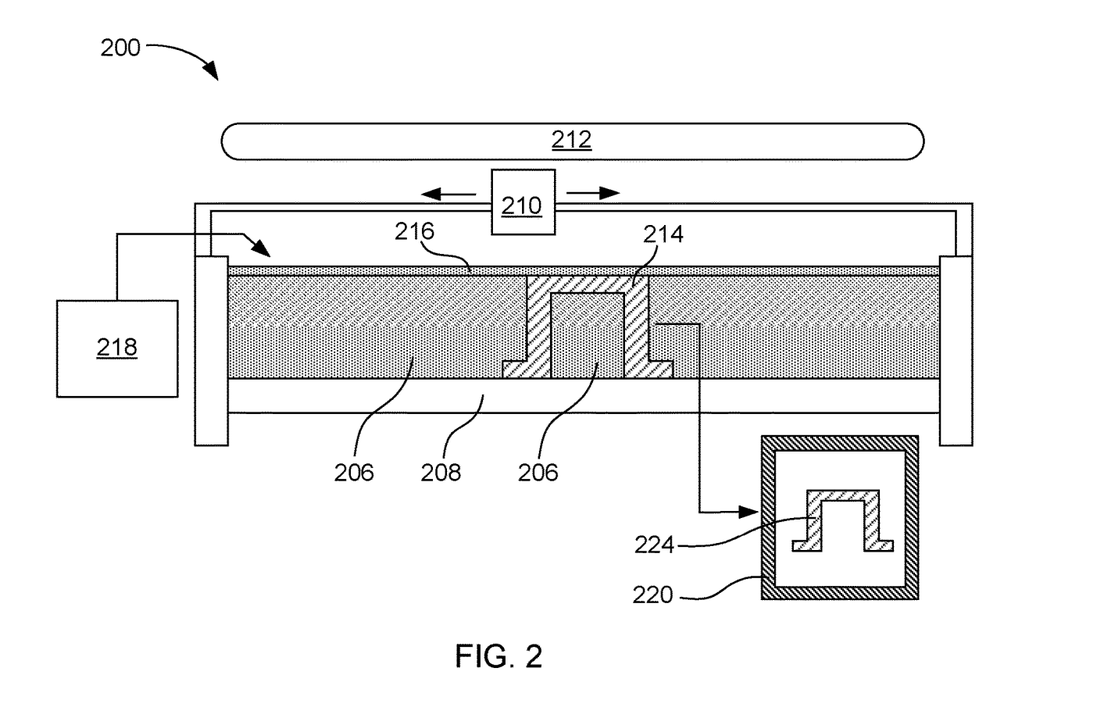
FIG. 2 schematically represents an alternative example system for three-dimensional printing in accordance with the present disclosure.

FIG. 2 illustrates schematically a related three-dimensional printing system 200 in accordance with examples of the present disclosure. In this FIG., the system can include a powder bed material 206 (with metal particles), a support substrate 208, a fluid ejector 210, a flash light or energy source 212 for generating or pulsing flash heat, and a powder material source 218 for supplying a new layer 216 of powder bed material for facilitating the build. For reference, a printed article 214 is also shown that can be printed using the present layer by layer printing process. As shown, the powder bed material (either bound together using the thermally sensitive binder fluid and the flash heating or as unprinted free or essentially free powder bed material) can sequentially support new layers during the build process. The powder bed material can be spread as a 25 μm to 400 μm layer of the powder bed material in the powder bed. Then the fluid ejector can eject a fluid over selected surface regions of the powder bed material and the flash heat light source can provide a pulsed light energy sufficient to generate heat at the powder bed material and thermally sensitive binder fluid (at the powder bed support substrate or on previously applied "green" layers) sufficient to cause the redox-reaction to occur. After the green part or object is formed, the system can include a heating chamber 220, or radiant oven, for example, to sintering or annealing green part or object, for example, to form a heat fused part 224 (not drawn to scale).

Figure 3:
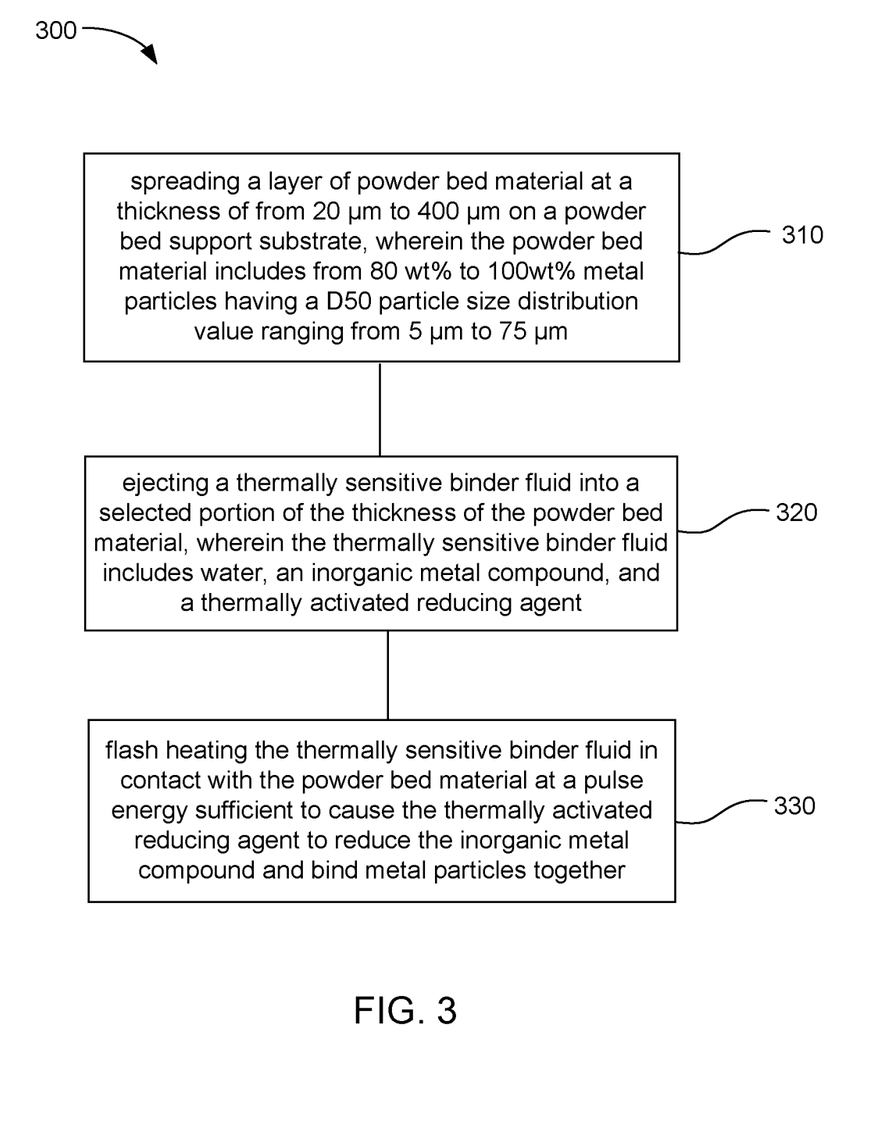
FIG. 3 includes a flow diagram on an example method of three-dimensional printing in accordance with examples of the present disclosure.

FIG. 3 provides a flow diagram of an example method 300 of three-dimensional printing in accordance with the present disclosure. The method can include spreading 310 a layer of powder bed material at a thickness of from 20 μm to 400 μm on a powder bed support substrate, ejecting 320 a thermally sensitive binder fluid into a selected portion of the thickness of the powder bed material, and flash heating 330 the thermally sensitive binder fluid in contact with the powder bed material at a pulse energy sufficient to cause the thermally activated reducing agent to reduce the inorganic metal compound and bind metal particles together. The powder bed material can include from 80 wt % to 100 wt % metal particles having a D50 particle size distribution value ranging from 5 µm to 75 µm. The thermally sensitive binder fluid can include water, an inorganic metal compound, and a thermally activated reducing agent.

As mentioned, the method can also include spreading a second layer of the powder bed material on top of the layer of powder bed material after flash heating, ejecting a second portion of the thermally sensitive binder fluid onto a second selected portion of the second layer, and flash heating the second portion of the thermally sensitive binder fluid in contact with the second layer of the powder bed material at a pulse energy sufficient to cause the thermally activated reducing agent to reduce the inorganic metal compound and bind metal particles together within the second layer of powder bed material as well as to metal particles of the layer of powder bed material. Then, a third layer can be applied similarly, and a fourth layer, etc., until a green three-dimensional part or object is formed. Thus, the green three-dimensional part can be formed that comprises the first layer and the second layer after flash heating the first layer and the second layer. In one example, the green three-dimensional part can undergo radiant heating, such as in an oven (e.g., sintering or annealing oven) to form a heat-fused three-dimensional part of sintered powder bed material. In another example, the method can include ejecting a third portion of the thermally sensitive binder fluid after flash heating the layer of powder bed material, but before spreading the second layer of the powder bed material. In this case, the additional (third portion) of the thermally sensitive binder fluid can be included to improve adhesion of the subsequently applied layer, e.g., the second layer of the powder bed material or any other subsequent layer, to the previously flash heated layers.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, "aspect ratio" refers to an average of the aspect ratio of the collective particles as measured on the individual particle by the longest dimension in one direction and the longest dimension in a perpendicular direction to the measured dimension.

"Particle size" refers to the diameter of spherical particles, or to the longest dimension of non-spherical particles.

As used herein, "first" and "second" are not intended to denote order. These terms are utilized to distinguish an element, component, or composition from another element, component, or composition. Thus, the term "second" does not infer that there is a "first" within the same compound or composition, but rather it is merely a "second" element, compound, or composition relative to the "first."

As used herein, a thermally sensitive binder fluid that provides "selective" binding of a powder bed material refers to a property of a fluid that when applied to the powder bed material and flash or pulse heated, can assist in binding metal particles together. The selective binding can include selecting a portion of a top layer of powder bed material, or even all (or none) of a top layer or a powder bed material, during a three-dimensional build in accordance with the present disclosure.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following illustrates several examples of the present disclosure. However, it is to be understood that the following is only illustrative of the application of the principles of the present disclosure. Numerous modifications and alternative methods and systems may be devised without departing from the spirit and scope of the present disclosure. The appended claims are intended to cover such modifications and arrangements.

Example 1

A Stainless steel (SLM-class) base powder and a copper oxide (CuO) ink, available from NanoCentrix under the trade name Metalon, was used to prepare a three-dimensional green part or object. In this example, the copper oxide ink is not used as indicated by the manufacturer (as an ink to print electronics), but rather is used as a copper oxide thermally sensitive binder fluid in accordance with examples of the present disclosure. The binder fluid includes both CuO nanoparticles and a reducing agent. In this example, a 300 µm single layer of the stainless steel powder bed material was spread on a quartz substrate. A rectangular pattern (aspect ratio about 7:1) was printed from a fluidjet pen, e.g., a thermal inkjet pen in this example, using 5 passes, 10 passes, or 20 passes (1200 dpi resolution). As a reference, after reduction of the CuO to elemental copper, the copper content in the green part or object was about 0.48 wt % copper, even though the copper oxide was present at a much higher concentration in the copper oxide ink. The powder bed material of stainless steel particles was kept at about 120° C. (below threshold of metal powder oxidation), allowing for the removal of a majority of aqueous liquid vehicle, e.g., water, organic solvents, etc., found in the binder fluid. Flash heating was then conducted using a commercial xenon pulse or strobe lamp in argon while the irradiated sample was then kept at about 110° C. Furthermore, 10 msec pulses of light energy were used with the number of pulses ranging from 1 to 10, and the pulse energy was also varied at from 8.6 J/cm² and 20.1 J/cm². Although instantaneous sample temperature was not measured (during the flash), in accord with the system calibration information, the flash temperature ranged from 350° C. to 700° C. in this example. Based on this testing, it was found that by varying the pulse frequency and pulse energy, different results could be achieved. For example, one approach that was particularly effective was to start with multiple lower energy pulses for removal of volatile liquids (and in some instances removal of organic residue) followed by several high energy pulses to initiate the reaction between the CuO and thermally sensitive reducing agent.

Figure 4:
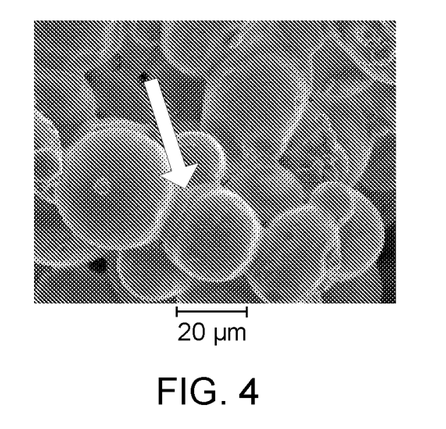
FIGS. 4-7 include various example scanning electron microscope (SEM) images illustrating metal particles of a powder bed material as well as a thermally sensitive binder fluid including reducible metal compound and a thermally active reducing agent, with images before and after flash heating, in accordance with the present disclosure.
Figure 5:
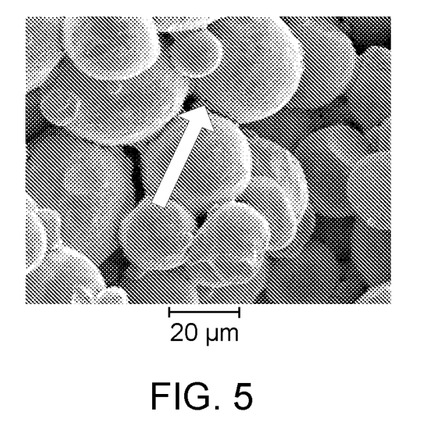
Figure 6:
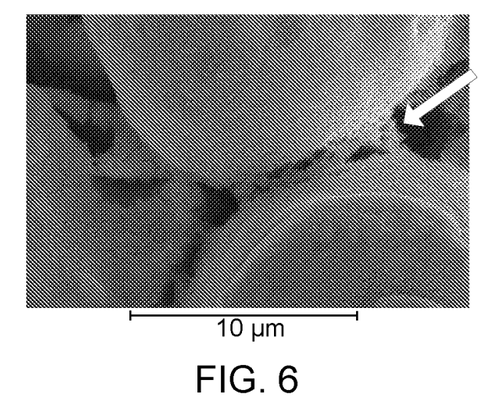

Flash heated specimens prepared in accordance with the present example were imaged using a scanning electron microscope (SEM), and the chemical composition was analyzed using Energy-Dispersive X-ray spectroscopy (EDX), which is an analytical technique used for elemental analysis or chemical characterization. In accordance with this, SEM imaging is shown in FIGS. 4-6. More specifically, FIG. 4 depicts an SEM image after the copper oxide thermally sensitive binder fluid has coated the stainless steel particles, but before flash heating. As can be seen in FIG. 4, the copper oxide thermally sensitive binder fluid has coated the stainless steel particles in a relatively non-uniform manner due to the surface tension of the thermally sensitive binder fluid and capillary forces. The surface tension and capillary forces tend to cause the thermally sensitive binder fluid to fill the gaps between adjacent particles forming circular, hollow bridges. Thus, at this stage of the process, the "ink bridges" mostly include dried copper oxide that does not provide much inter-particle mechanical strength.

FIG. 5, on the other hand, shows the same material after flash heating the composition. After flash heating, the copper oxide thermally sensitive binder fluid forms thinner bridges that can occasionally break due mostly to thermal stresses associated with rapid heating/cooling and to removal of residual binder fluid additives, e.g., water, organic solvent, surfactant, etc., but can provide improved inter-particle binding properties. Furthermore, the overall mass of now elemental copper is decreased compared to the copper oxide shown in FIG. 4. FIG. 6 is a closer view of the metal particles and elemental copper bridges shown in FIG. 5. Note that the elemental copper bridges were verified by EDX analysis.

Oven heating is then carried out to heat fuse the stainless steel metal particles (temporarily held together using the copper bridges described above). The oven is heated with the green part therein at a temperature raising profile of about 10° C. per hour to a sintering or even a melting temperature for the stainless steel metal particles, e.g., from about 960° C. to about 1460° C. A heat fused part having a metal part density of at least about 90% is formed that can be characterized as a rigid, solid, and sturdy object.

Example 2

Figure 7:
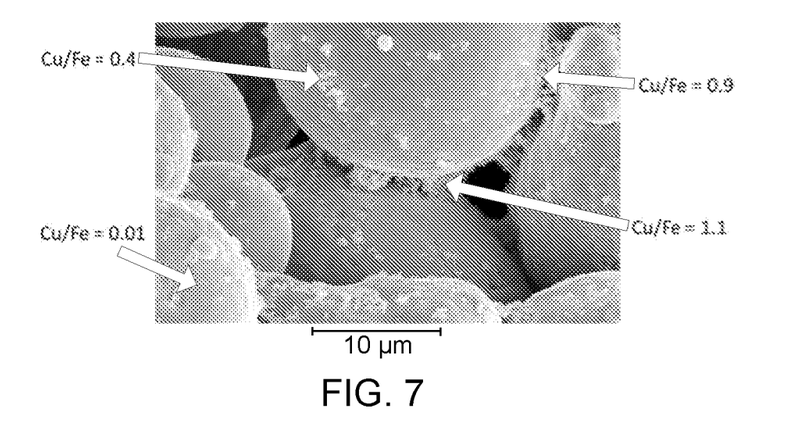

An experiment similar to that described in Example 1 was conducted, but in this example, the thermally sensitive binder fluid was formulated in-house using water, copper oxide nanoparticles, 2-pyrrolidone (as an organic co-solvent and as the thermally sensitive reducing agent), and various other additives in minor amounts to provide acceptable fluid jettability, e.g., surfactant, anticogation agent, biocide, etc. More specifically, the CuO was included at 0.7 grams and dispersed in 3.3 grams of organic solvent (50:50 mixture by weight of ethylene glycol and 2-pyrrolidinone). Surfynol® 420 (1 g) was then added to the dispersion and sonicated for 10 minutes. After sonication, 5 grams of liquid vehicle concentrate was then added having 50 wt % of water, 40 wt % 2-pyrrolidinone, and other additives, e.g., surfactant. The total concentration of 2-pyrrolidinone in the thermally sensitive binder fluid that provided the hydrogen donors to the CuO (reduction reaction to elemental copper) was about 35 wt %. The flash heating provided very similar results compared to that described and shown in Example 1. To illustrate, FIG. 7 shows the formation of elemental copper bridges in some details. However, in this specific case (as shown in FIG. 7), some of the reduced copper agglomerated on the surface of the stainless steel, forming some nanoparticles that did not contribute to copper bridge formation. These agglomerated copper particles may be able to be minimized or even eliminated by modifying the thermally sensitive binder fluid formulation, e.g., by including more 2-pyrrolidone or some other reducing agent additive. That being stated, the presence of the agglomerated copper is not particularly harmful to the formation of a three-dimensional green object, as when ultimately heat fused (in an annealing or sintering oven, for example), the smaller metals may tend to melt or become integrated in the object as a whole with no particular reason to consider removing these small particles (unlike polymer binder which may be considered a contaminant in some examples). Notably, the EDX provided measured information related to the ratio of Cu to Fe where EDX was measured. Higher Cu/Fe indicated a larger concentration of copper, and a lower Cu/Fe ratio indicated a lower concentration of copper.

Oven heating is then carried out to heat fuse the stainless steel metal particles (temporarily held together using the copper bridges described above). The oven is heated with the green part therein at a temperature raising profile of about 10° C. per hour to a sintering or even a melting temperature for the stainless steel metal particles, e.g., from about 960° C. to about 1460° C. A heat fused part having a metal part density of at least about 90% is formed that can be characterized as a rigid, solid, and sturdy object.

What is claimed is:
1. A three-dimensional printing system, comprising:
  a powder bed material including particles, wherein from 80 wt % to 100 wt % of the particles in the power bed material are metal particles, and wherein the metal particles have a D50 particle size distribution value ranging from 5 μm to 70 μm;
  a powder bed support substrate for receiving the powder bed material;
  a fluid elector operable to deposit a thermally sensitive binder fluid onto a selected portion of the powder bed material on the powder bed support substrate;
  the thermally sensitive binder fluid including from 20 wt % to 95 wt % water, from 2 wt % to 40 wt % reducible metal compound, and from 2 wt % to 40 wt % thermally activated reducing agent; and
  a non-coherent light source to generate flash heating at a pulse energy from 15 J/cm2 to 50 J/cm2 resulting in a temperature from 200° C. to 1000° C. and which is sufficient to cause the thermally activated reducing agent to reduce the reducible metal compound and bind the metal particles together to from a green three-dimensional part.

2. The three-dimensional printing system of claim 1, wherein the metal particles are selected from aluminum titanium, copper, cobalt chromium nickel, vanadium tungsten, tungsten carbide, tantalum, molybdenum, gold, silver, stainless steel, steel, alloys thereof, or admixtures thereof.

3. The three-dimensional printing system of claim 1, wherein the thermally sensitive binder fluid is a polymer-free thermally sensitive binder fluid.

4. The three-dimensional printing system of claim 1, wherein the reducible metal compound includes a metal oxide.

5. The three-dimensional printing system of claim 1, wherein the reducible metal compound includes a metal salt selected from metal bromides, metal chlorides, metal nitrates, metal sulfates, metal nitrites, metal carbonates, or a combination thereof.

6. The three-dimensional printing system of claim 1, wherein the reducible metal compound includes metal compound nanoparticles having a particle size from 10 nm to 1 μm.

7. The three-dimensional printing system of claim 1, wherein the thermally activated reducing agent is selected from hydrogen, lithium aluminum hydride, sodium borohydride, a borane, sodium hydrosulfite, hydrazine, a hindered amine, 2-pyrrolidone, ascorbic acid, a reducing sugar, diisobutylaluminium hydride, formic acid, formaldehyde, or mixtures thereof.

8. The three-dimensional printing system of claim 1, wherein the non-coherent light source is positioned within 5 mm to 150 mm away from the powder bed material during operation.

9. The three-dimensional printing system of claim 1, further comprising:
a heating chamber to convert the green three-dimensional part to heat-fused three-dimensional part of sintered powder bed material.

10. The three-dimensional printing system of claim 1, wherein the non-coherent light source is to generate a pulse energy up to a melting temperature of the metal particles.

11. The three-dimensional printing system of claim 1, wherein the thermally sensitive binder fluid excludes polymer binder; and the three-dimentional printing system further comprises a sintering oven.

12. The three-dimensional printing system of claim 1, wherein the thermally activated reducing agent is 2-pyrrolodine.

13. The three-dimensional printing system of claim 1, wherein the non-coherent light source includes a pulsed gas discharge lamp.

14. A method of three-dimensional printing, comprising:
spreading a layer of powder bed material at a thickness of from 20 μm to 400 μm on a powder bed support substrate, wherein the powder bed material includes particles and from 80 wt % to 100 wt % of the particles in the powder bed material are metal particles having a D50 particle size distribution value ranging from 5 μm to 75 μm;
ejecting a thermally sensitive binder fluid into a selected portion of the thickness of the powder bed material, wherein the thermally sensitive binder fluid includes from 20 wt % to 95 wt % water, from 2 wt % to 40 wt % reducible metal compound, and from 2 wt % to 40 wt % thermally activated reducing agent; and
flash heating the thermally sensitive binder fluid in contact with the powder bed material with a non-coherent light source at a pulse energy ranging from 15 J/cm2 to 50 J/cm2 resulting in a temperature from 200° C. to 1,000° C. which is sufficient to cause the thermally activated reducing agent to reduce the reducible metal compound and bind metal particles together.

15. The method of claim 14, further comprising:
spreading a second layer of the powder bed material on top of the layer of powder bed material after flash heating;
ejecting a second portion of the thermally sensitive binder fluid onto a second selected portion of the second layer; and
flash heating the second portion of the thermally sensitive binder fluid in contact with the second layer of the powder bed material at a pulse energy sufficient to cause the thermally activated reducing agent to reduce the reducible metal compound and bind the metal particles together within the second layer of powder bed material as well as the metal particles of the layer of powder bed material,
wherein a green three-dimensional part is formed that comprises the first layer and the second layer after flash heating the first layer and the second layer.

16. The method of claim 15, comprising radiant heating the green three-dimensional part to form a heat-fused three-dimensional part of sintered powder bed material.

17. The method of claim 15, further comprising ejecting a third portion of the thermally sensitive binder after flash heating the layer of powder bed material, but before spreading the second layer of the powder bed material.

* * * * *